United States Patent [19]
Rejsa

[11] 3,933,085
[45] Jan. 20, 1976

[54] POTATO CORING MACHINE

[75] Inventor: Jack J. Rejsa, Minneapolis, Minn.

[73] Assignee: The Pillsbury Company, Minneapolis, Minn.

[22] Filed: Mar. 11, 1974

[21] Appl. No.: 449,815

[52] U.S. Cl. .................. 99/544; 83/409.2; 99/589; 99/590
[51] Int. Cl.² ........................................ A23N 3/04
[58] Field of Search ............ 99/540, 541, 544, 588, 99/589, 590, 591, 594, 595; 221/298; 83/404.1, 404.3, 411 R, 409.2

[56] References Cited
UNITED STATES PATENTS

| | | | |
|---|---|---|---|
| 1,155,455 | 10/1915 | Wegner | 83/409.2 |
| 2,765,829 | 10/1956 | De Back | 99/590 |
| 3,300,090 | 1/1967 | Carden | 221/289 |
| 3,528,470 | 9/1970 | De Back | 99/589 |

*Primary Examiner*—Hornsby, Harvey C.
*Assistant Examiner*—James A. Niegowski
*Attorney, Agent, or Firm*—James V. Harmon; Michael D. Ellwein

[57] ABSTRACT

An apparatus is provided for coring potatoes which comprises the supporting framework upon which is mounted a potato coring knife and a conveyor for transporting potatoes toward the knife and through the plane of the knife. The framework has an inlet end and the conveyor is mounted between the coring knife and the inlet end of the framework. A drive means such as a motor is mounted on the framework and connected to the conveyor for running the conveyor in the proper direction to transport the potatoes to the coring knife. The conveyor includes potato contacting members adapted to engage the potatoes and advance them toward the knife. The coring knife is of annular or endless configuration with an opening in its center. As the potatoes are forced through the plane of the knife by the conveyor, the center or core portion is removed. The potatoes are then transferred to a potato core holding guide with at least one bore therethrough defining a pocket which is open at each end. Cutting blades are mounted on the apparatus adjacent to the ends of the pockets for removing portions of the core ends which project from the pocket when relative motion is established between the knives and the pockets.

4 Claims, 5 Drawing Figures

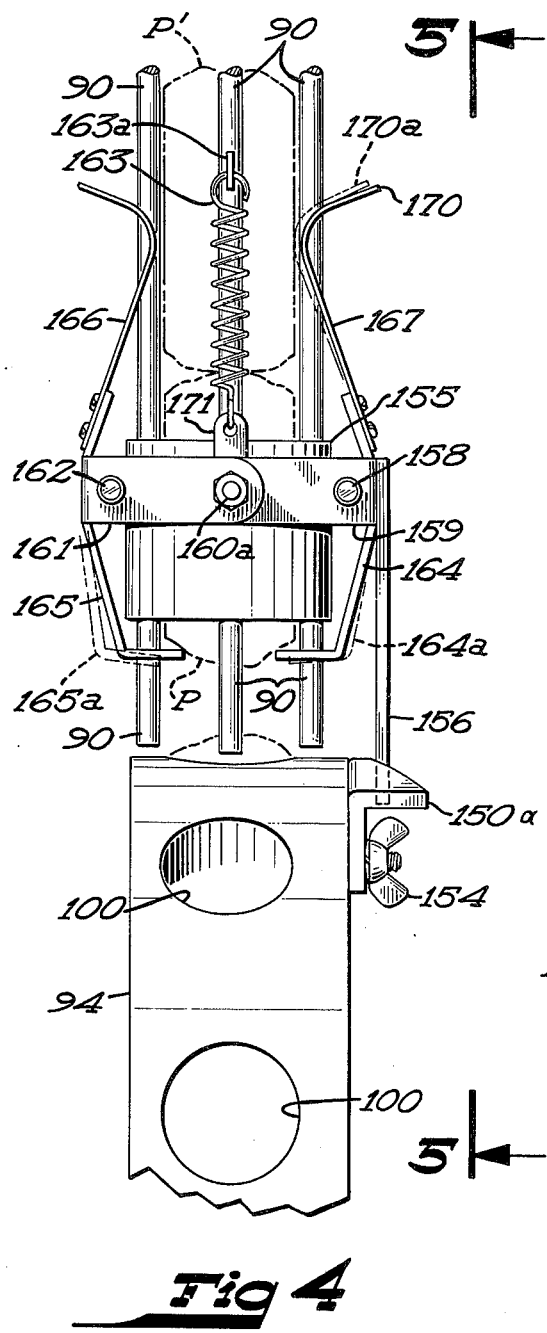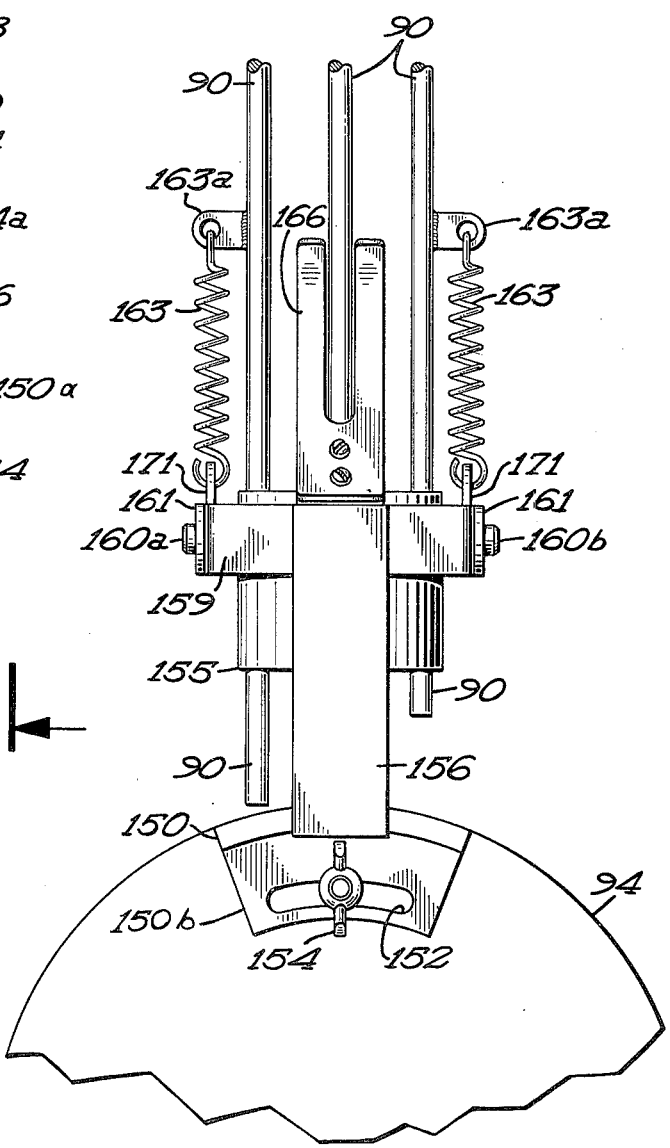

3,933,085

POTATO CORING MACHINE

FIELD OF THE INVENTION

The present invention relates to potato processing and more particularly to equipment for removing the center portion or core from potatoes.

THE PRIOR ART

In certain potato processing operations such as the manufacture of frozen french fries, frozen julienne potatoes, frozen hash browns and scalloped potatoes, it is frequently desirable to start with a large potato piece of uniform size and shape. To supply this requirement, the center portion or core of the potato is presently removed commercially by an apparatus which employs a stream of water to force the potatoes against a stationary ring shaped knife. This apparatus requires a large supply of water for operation and results in substantial fluid effluents which are undesirable because of the environmental effect. The pumping of water also requires substantial energy and the equipment is expensive.

OBJECTS OF THE INVENTION

The main objects are: (a) to remove the potato cores from whole potatoes in a dry condition, (b) provide an option for washing away accumulated starch and potato pieces with a small amount of water, (c) provision for positioning the potatoes accurately so that their centers are in alignment with the center of the coring knife, (d) an optional provision for removing the core ends from the cores, (e) the provision in two successive steps of removing the cores from the potatoes and the core ends from the cores in which the latter operation is capable of handling the entire output of the core removal operation, (f) provision of a dual means for aligning the potatoes on the center of the coring knife axis prior to passage through the plane of the knife; (g) the provision of potato engaging teeth adapted to handle all sizes of potatoes within a wide range, (h) a provision for shifting the potato cores to a selected position prior to removing their ends by the combined action of gravity and centrifugal force and (i) provision for making the cores as long as possible by removing ends of a constant length from each core.

THE FIGURES

FIG. 4 is a side elevational view of the escapement on an enlarged scale relative to FIG. 1 and FIG. 5 is a view on line 5—5 of FIG. 4.

SUMMARY OF THE INVENTION

Briefly, an apparatus is provided for coring potatoes which comprises the supporting framework upon which is mounted a potato coring knife and a conveyor for transporting potatoes toward the knife and through the plane of the knife. The framework has an inlet end and the conveyor is mounted between the coring knife and the inlet end of the framework. A drive means such as a motor is mounted on the framework and connected to the conveyor for running the conveyor in the proper direction to transport the potatoes to the coring knife. The conveyor includes potato contacting members adapted to engage the potatoes and advance them toward the knife. The coring knife is of annular or endless configuration with an opening in its center. As the potatoes are forced through the plane of the knife by the conveyor, the center or core portion is removed. In a preferred form of the invention, the potatoes are then transferred to a potato core holding member with at least one bore therethrough defining a pocket which is open at each end. Cutting blades are mounted on the apparatus adjacent to the ends of the pockets for removing portions of the core ends which project from the pocket when relative motion is established between the knives and the pockets.

DESCRIPTION OF THE PREFERRED EMBODIMENT

Figure 1:
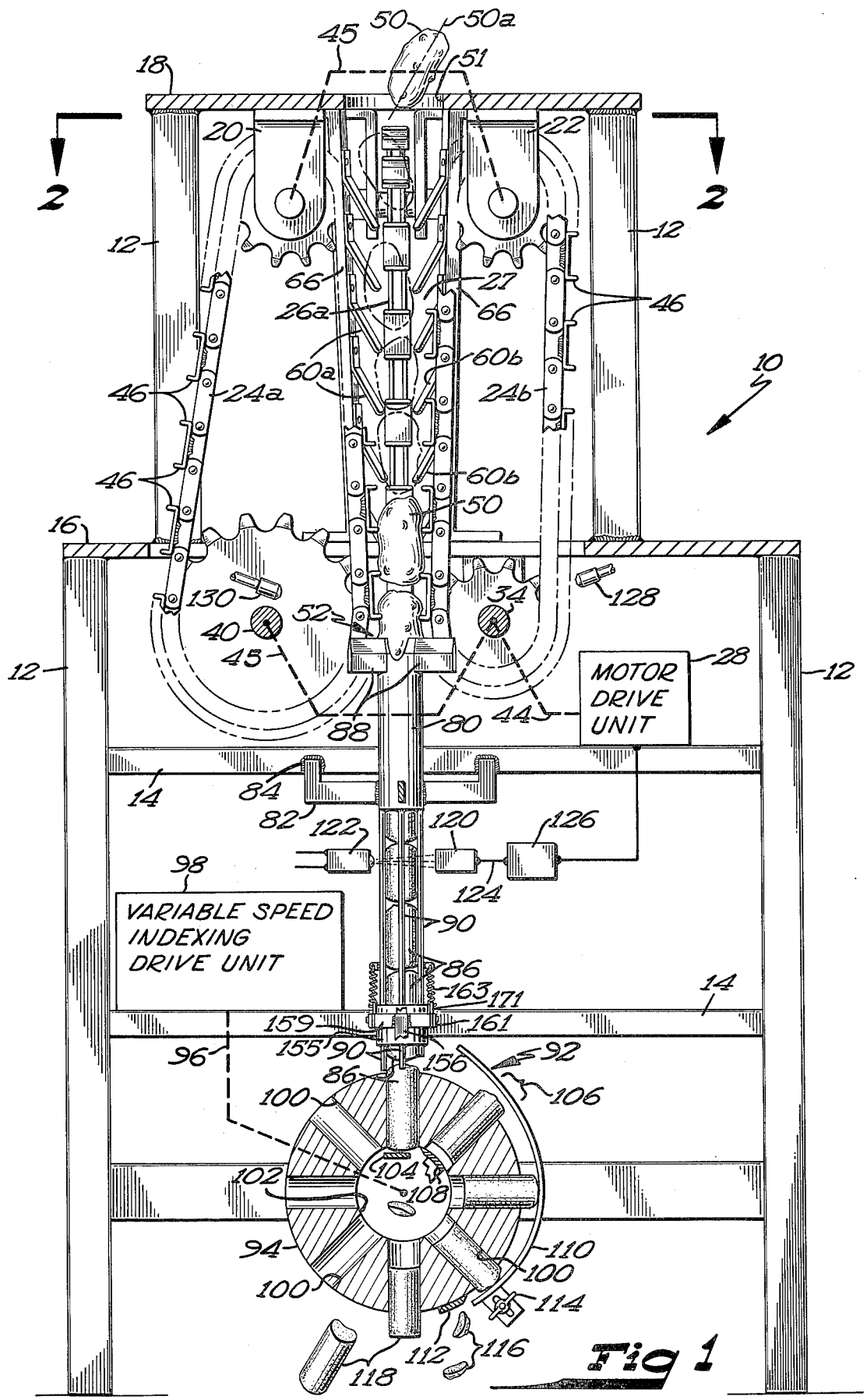
FIG. 1 is a semi-diagrammatic side elevational view of the invention.
Figure 2:
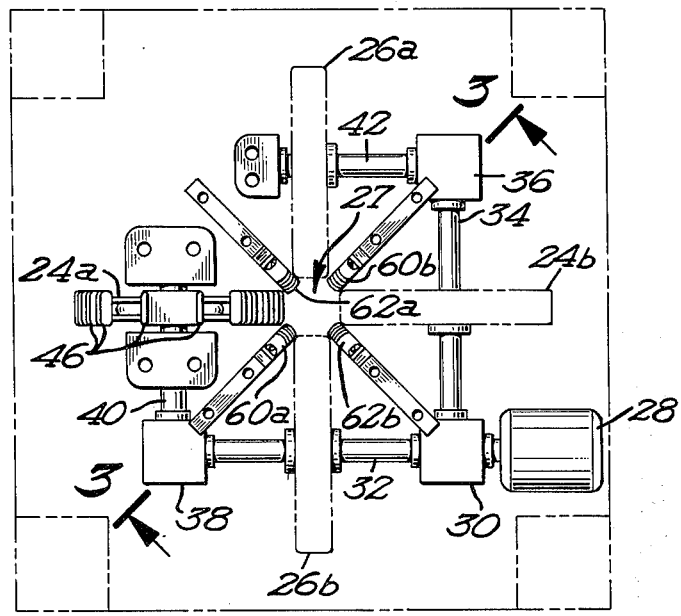
FIG. 2 is a horizontal cross sectional view taken on line 2—2 of FIG. 1.

Shown in the figures is a supporting framework 10 made up of posts 12, horizontal cross members 14 and vertically spaced conveyor support plates 16 and 18. Suitably mounted upon the plates 16 and 18 for example, by means of brackets 20 and 22 (not all of which are shown) are two pairs of mutually perpendicular chain conveyors 24a and 24b and 26a and 26b, the pair 24a and 24b being mutually co-planar and the pair 26a and 26b also being mutually co-planar and each pair arranged at right angles relative to the other to define a vertically disposed transfer channel indicated generally by the numeral 27 between the inward run of each of the conveyors which are spaced 90° apart as seen from above. The conveyors 24–26 each include vertically spaced conveyor sprockets and endless chains entrained thereover. The conveyors are suitably driven in the indicated direction by a motor drive means 28 acting through a gear box 30 as seen in FIG. 2, mutually perpendicular shafts 32 and 34, right angle gear boxes 36 and 38 and shafts 40 and 42 which for simplicity are indicated by a dotted line 44 and 45 in FIG. 1. Some of the sprockets of the conveyors 24 to 26 are larger than others merely for the purpose of accomodating specific commercially available gear boxes. It should be understood, however, that all of the conveyor chains travel at the same speed and in the same direction within the flow-path 27.

Each of the chains of conveyors 24a–26b are provided with laterally projecting teeth comprising flanges 46 having sharpened outer edges which extend normal to the axis of the chains in an outward direction from the chain whereby they project toward the center of the transfer channel 27 thereby engaging the potatoes 50 soon after the potatoes enter an opening in plate 18 which serves as the inlet end of the apparatus. The chains convey the potatoes in a downward direction through the transfer channel 27 and through the plane of the core removal knife 52. The blades 88 are positioned in vertical alignment with the guides 60a to 62b and are thus located intermediate the chains 24a to 26b. It should be noted that the shaft of each of the conveyor sprockets is positioned at the proper distance from the others to cause the inner run of each chain to converge slightly proceeding downwardly from the inlet end 51 to the core removing knife 52. This causes the teeth 46 to gradually converge towards one another thereby aiding in orienting potatoes 50 so that their longitudinal axis as indicated at 50a (FIG. 1) is aligned with the longitudinal axis of the transfer channel 27 and the center of the core removal knife 52.

Figure 3:
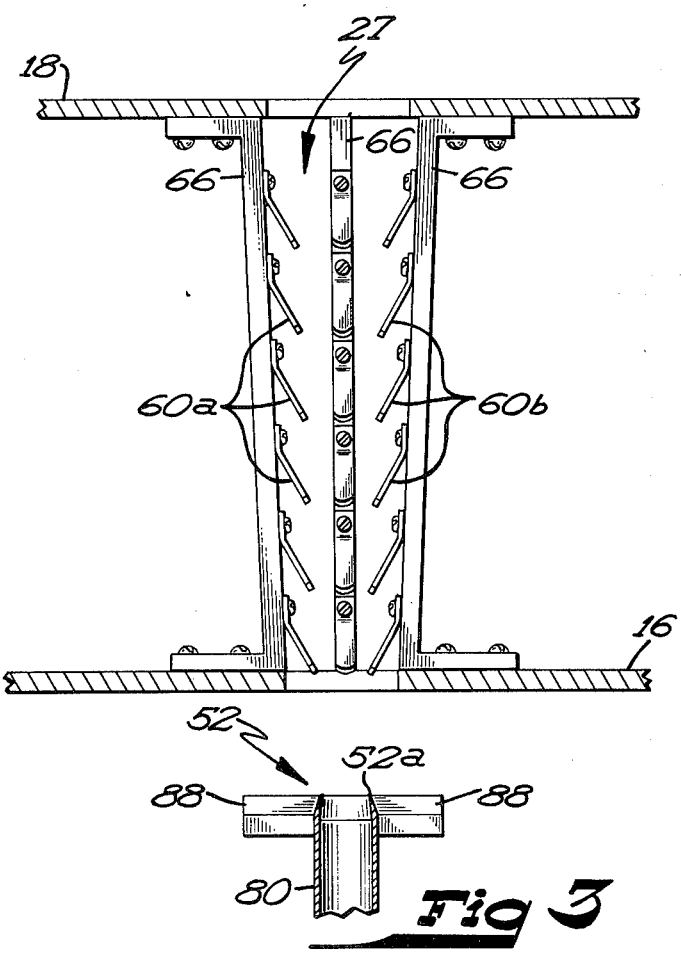
FIG. 3 is a partial vertical sectional view taken on line 3—3 of FIG. 2.

As best shown in FIGS. 2 and 3, a second potato orienting means is provided consisting of a plurality of downwardly directed leaf springs 60 comprising a first pair 60a–60b on opposite sides of the transfer channel 27 and a second mutually perpendicular pair 62a–62b also on opposite sides of the transfer channel 27. It will be seen that the upper end of each of the leaf springs is rigidly secured at its upper end to slightly incline brackets 66 mounted rigidly between plates 16 and 18. The lower ends of the springs are positioned closest to the center of the transfer channel to urge and project portions of the potatoes towards the center of the channel as they travel downwardly. The potatoes are thus aligned with the central axis at the channel and the cutting knife 52 by the dual action of the leaf springs 60a–60b and the convergence of the conveyor chains 24a–26b.

The endless coring knife 52 is defined by the upper sharpened edge 52a of the tube 80 supported upon a bracket 82 which is fastened at 84 to one of the cross pieces 14 of framework 10. The upper sharpened edge 52a of the blade 52 is in this instance circular but may be square, hexagonal, or some other shape such as octagonal provided it is substantially closed upon itself or nearly so whereby an elongated central core portion such as those indicated at 86 is removed from each of the potatoes 50. Supported on the upper end of the knife 52 are radially extending horizontally disposed knives 88 arranged in two mutually perpendicular pairs in this case, each 90° apart with sharpened edges that are directed upwardly to slice the outer part of the potato into four pieces which fall into a collection bin or trough (not shown in the drawings for the sake of clarity). Any suitable catching arrangement can be provided. As shown in FIG. 3, the inner surface of the knife 52 is relieved somewhat, making the inner diameter of tube 80 larger than the diameter at the cutting edge 52a so that the cores will fall easily through the tube 80.

Below the tube 80 is a vertically disposed guide consisting of vertical rods defining a guide 90 that define a channel to carry the cores to the end removal assembly 92, composed of a pocketed wheel 94 with a central axial bore driven as indicated diagrammatically by dotted line 96 by a variable speed indexing drive means 98. The pocketed wheel is journaled for rotation on a horizontal axis and is provided with a plurality of radially extending pockets 100 each having a cylindrical bore being open at its inward and outward ends so that the potato core 86 will be free to fall from the guide 90 into a pocket each time the pocketed wheel 94 is stopped below the guide 90. The indexing drive 98 adapted to move the pocketed wheel 94 adapted to a transfer pocketed wheel 94 such that each successive pocket comes into alignment with the guide 90 and stops momentarily from about 100 to 500 times per minute in a typical operation. Within the bore 102 at the center of the wheel is provided a fixed stop 104 mounted on framework 10 on which the lower end of the core 86 rests when the core is passed all the way through the uppermost pocket 100. During the next index to position 106 the inward end of the core is removed by an end removing blade 108 which is also affixed to the framework adjacent to the periphery of bore 102 and the inward end of each successive pockets 100 as they move relative thereto. A second stop comprising a curved plate 110 is mounted upon the framework adjacent the outward ends of the pockets 100 and spaced slightly therefrom. This stop prevents the cores 86 from being thrown outwardly beyond a predetermined point as the wheel 94 rotates. Affixed to the framework 10 is a second blade 112 positioned adjacent to the outer openings of each of the pockets 100 in a position adapted to remove the outer end of each of the cores and an adjustment 114 as provided for selectively changing the distance of the stop 110 from the edge of wheel 94 to control the length of the pieces cut from the end of the core 86 by blade 112. It should be understood that as the wheel 94 rotates the outward shifting of each of the cores is accomplished both by gravity and by centrifugal force thereby reliably throwing them against stop 110. The slices of potato are removed from the outward end of each of the cores shown at 116 and the cores themselves are free to fall out of the wheel 94 as shown at 118 and are caught in a suitable container or conveyor (not shown).

The apparatus can be operated in a number of ways but in a preferred embodiment, the variable speed indexing drive 98 locates each successive pocket in a position below the guide 90 to receive each successive core and then advance the pocket past the blades 108 and 112. The drive 98 is preferably run at a continuous speed and the motor drive unit 28 is varied in speed as controlled by photocell 120 sensing a light beam from the lamp 122 which feeds the signal via conductor 124 to a controller 126 that looks for a blocked beam longer than a selected time period T, and if the light is blocked for a time period greater than time T the operation of the motor drive unit 28 is interrupted temporarily. Washing of the apparatus is accomplished by spray-heads 128 and 130 which spray out just sufficient water to clear away the starch and other foreign materials from the coring knife 52.

Refer now to FIGS. 4 and 5 with reference to the escapement used for holding the potatoes temporarily until the pocketed wheel 94 has indexed to a position in which one of the pockets is directly beneath the potato guide chute.

Mounted on the side of the wheel 94 are a plurality of laterally projecting circumferentially spaced cams 150 and include a cam lobe portion 150a. Each of the cams 150 is provided with a base or mounting plate 150b having a slot 152 therein allowing the cam to be slid circumferentially on the wheel 94 where it is held in position by a thumb nut 154.

The escapement is supported upon a collar 155 affixed to the outer edges of the rods which make up the guide 90. The escapement includes a cam follower lever 156 that extends downwardly beyond the lower edge of the guide to the plane of each one of the successive cams 150 in position to engage a cam and to be pivoted in a counterclockwise direction about a pivot 158 as seen in FIG. 4. Lever 156 has secured to it a yoke 159 which is generally C-shaped as seen from above. The free ends of the yoke are pivoted by means of pins 160a and 160b on either side of the collar 155 to a similar yoke 161. The yoke 161 is pivoted to the collar 155 at 162.

Secured rigidly to the respective yokes 159 and 161 are two potato retaining arms 164 and 165 the ends of which project centrally to engage the bottom of the potato when the arms are in their inward solid line positions. In their deflected positions (at the time the follower 156 strikes the cam lobe 150a the free ends thereof are free of the potato P which is then able to slide downwardly into one of the pockets 100. The next potato P' is held in position at this time by snubbers 166 and 167 formed from resilient sheet metal strips affixed to and extending upwardly from the upper ends of the retaining arms 165 and 164 respectively. The snubbers include at their upper ends portions adapted to engage the sides of the potatoes P' when the lower end of lever 156 is pivoted outwardly. The escapement is normally biased to the solid line position of FIGS. 4 and 5 with the lower ends of the retaining arms 164 and 165 in a potato engaging position by springs 163 secured at their upper ends to lugs 163a and at their lower ends to a pair of elevating tongues 171 fastened to the pivot pins 160a and 160b. The snubbers and the retainers are both bifurcated at their free ends to extend on opposite sides of the vertical rods which make up the guide 90.

During operation it will be understood that as the cams 150 are moved into contact with the lever arm 156, the yokes will pivot on their pins 158 and 162 lowering the pins 160a and 160b against the tension of the springs 163 and spreading the free ends of the retainers 165 and 164. This allows the lowermost potato P to fall into the pocket 100 immediately below it while the wheel 94 is stopped. At the same time, the snubbers 166 and 167 engage the sides of the potato piece P' to prevent it from moving as the lowermost piece of potato falls into one of the pockets 100. After the cam has moved past lever 156, it will be returned to the solid line position by springs 163 and piece P' will fall into engagement with the retainer. The escapement may, therefore, be thought of as being operatively associated with the pocketed member to operate in timed relationship with it and having means for releasing the potato piece closest to the pocketed member to move into one of the pockets when the pocket is aligned with the guide and for simultaneously temporarily restraining the next adjacent potato piece to prevent it from transferring to the pocket with the other potato piece.

It will be seen that the cores are removed in a substantially dry state not considering the small amount of water introduced by the sprayhead. The potatoes are, moreover, reliably aligned with the center of the coring knife two ways, viz. by the convergence of the chains and also by the pressure of the leaf springs 60a–62b. Moreover, the sensor such as electric eye 120, will reliably allow the core end trimming assembly 92 to handle the entire output of the coring knife 52. It should also be noticed that the teeth 46 of the conveyor will handle potatoes of all sizes within a predetermined selected range before entering the apparatus and provide a much greater driving force than pinlike teeth. It should also be noted that because the ends trimmed from the core by blades 108 and 112 are of the same length. The cores are as long as can be obtained from the particular potato being processed, i.e., longer potatoes will result in longer cores.

What is claimed is:

1. An apparatus for coring potatoes comprising a framework having a potato inlet, a coring knife mounted on the framework, a conveyor between the knife and the inlet, a conveyor drive connected to the conveyor for imparting motion thereto, said conveyor including potato contacting members for engaging each potato to advance the potato on the framework towards the knife and force the potato through the plane of the knife whereby the knife removes a central core portion from each potato, a moveable potato core holding member with at least one bore extending therethrough to define a pocket which is open at each end, each such pocket having a cross sectional size slightly larger than the size of the core so that the core is free to slide therethrough, cutting blades associated with the holding member for trimming the ends from the core when the holding member is moved relative to the cutting blades, guide means having an inlet end adjacent the knife and an outlet end adjacent the holding member to facilitate transfer of each core to a pocket in the holding member, the guide being larger in diameter than the diameter of the core and being disposed vertically so that the potato cores are free to slide from the knife to the holding member through the guide, an indexing drive means connected to the holding member for moving the holding member relative to the outlet end of the guide means at uniform intervals whereby each successive potato core will fall into one of the pockets, sensing means operatively associated with the guide and positioned to sense the presence or absence of potato cores within the guide, the sensing means being connected to said conveyor drive whereby the conveyor drive unit is varied in speed as controlled by the sensing means thereby coordinating the speed of the conveyor and the speed of the holding member.

2. The apparatus of claim 1 wherein an escapement means is operatively connected to the apparatus adjacent to the holding member for holding the potato cores temporarily until the pocketed holding member has indexed to a position in which one of the pockets is aligned with the outlet end of said potato guide.

3. An apparatus for coring potatoes comprising a framework having a potato inlet, a coring knife mounted on the framework, a conveyor between the knife and the inlet, said conveyor including potato contacting members for engaging each potato to advance the potato on the framework towards the knife and force the potato through the plane of the knife whereby the knife removes a central core portion from each potato, a potato core holding wheel mounted in spaced relationship to the knife, said wheel having a plurality of radially extending pockets therein, a drive shaft supporting the wheel for rotation upon an axis at the junction of lines extending centrally from each pocket, a guide means between the knife and the wheel for guiding the potato cores from the knife to the outer open ends of the pockets extending through the wheel, each of the pockets through the wheel being open at its outer and inner ends, first and second stationary cutting blades at the inner and outer ends of the pockets respectively, a first stop mounted adjacent the inner ends of the pockets for supporting the potato with its inward end extending a predetermined distance beyond the inward end of each pocket when the pocket is rotated past the first cutting blade, drive means connected to the wheel for rotating the wheel, a second fixed stop mounted radially outward from the wheel whereby the rotation of the wheel causes an outward shifting of each of the cores due to centrifugal force thereby throwing the potato cores outwardly against said second stop means so that the outer end of each potato core projects through the outer open end of each pocket in position to be removed by the second cutting blade.

4. An apparatus for coring potatoes comprising a framework having a potato inlet, a coring knife mounted on the framework, a conveyor between the knife and the inlet, a conveyor drive connected to the conveyor for imparting motion thereto, said conveyor including potato contacting members for engaging each potato to advance the potato on the framework towards the knife and force the potato through the plane of the knife whereby the knife removes a central core portion from each potato, a moveable potato core holding member with at least one bore extending therethrough to define a pocket which is open at each end, each such pocket having a cross sectional size slightly larger than the size of the core so that the core is free to slide therethrough, cutting blades associated with the holding member for trimming the ends form the core when the holding member is moved relative to the cutting blades, guide means having an inlet end adjacent the knife and an outlet end adjacent the holding member to facilitate transfer of each core to a pocket in the holding member, and an escapement comprising a pair of yokes pivoted to the guide, an operating cam engaging lever connected to one of the yokes and extending downwardly in a position engagable with the pocketed member, restraining arms connected to the yokes to engage the potato piece closest to the pocket to prevent entry thereinto, resilent means biasing the escapement to the potato retaining position and snubbers connected to the yokes for engaging the potato piece adjacent the piece closest to the pocket when the retainers are moved to the potato releasing position.

* * * * *